(12) United States Patent
Benyahia et al.

(10) Patent No.: US 9,421,849 B2
(45) Date of Patent: Aug. 23, 2016

(54) POLYMERIC VEHICLE WINDOW HAVING AN LED ASSEMBLY

(71) Applicant: SAINT-GOBAIN GLASS FRANCE, Courbevoie (FR)

(72) Inventors: Rym Benyahia, Stuttgart (DE); Daniel Anderlini, Chevigney les Vercel (FR); Emmanuel Gerard, Noironte (FR)

(73) Assignee: SAINT-GOBAIN GLASS FRANCE, Coubevoie (FR)

( * ) Notice: Subject to any disclaimer, the term of this patent is extended or adjusted under 35 U.S.C. 154(b) by 0 days.

(21) Appl. No.: 14/435,437

(22) PCT Filed: Oct. 14, 2013

(86) PCT No.: PCT/EP2013/071394
§ 371 (c)(1),
(2) Date: Apr. 13, 2015

(87) PCT Pub. No.: WO2014/060338
PCT Pub. Date: Apr. 24, 2014

(65) Prior Publication Data
US 2015/0273986 A1    Oct. 1, 2015

(30) Foreign Application Priority Data

Oct. 19, 2012   (EP) ..................................... 12189245

(51) Int. Cl.
*F21V 13/02* (2006.01)
*B60Q 1/26* (2006.01)
(Continued)

(52) U.S. Cl.
CPC . *B60J 1/20* (2013.01); *B32B 27/08* (2013.01); *B32B 27/20* (2013.01); *B60J 1/008* (2013.01);
(Continued)

(58) Field of Classification Search
CPC .... B60Q 1/268; B60Q 1/2696; B60Q 3/0213; F21S 48/22; F21S 48/2206; F21S 48/2212; B29C 70/88; F21V 13/02; F21V 13/04; B60J 1/008; B60J 1/10; B60J 1/20; B38B 27/08; B38B 27/20; Y10T 29/49169
USPC ....................................................... 264/272.17
See application file for complete search history.

(56) References Cited

U.S. PATENT DOCUMENTS 5,490,049 A * 2/1996 Montalan ............. B60Q 1/2696
                                                        362/240
5,621,942 A * 4/1997 Eustache ................ B60Q 1/268
                                                       15/250.001

(Continued)

FOREIGN PATENT DOCUMENTS

DE      19633959     2/1997
DE      19706043     6/1998

(Continued)

OTHER PUBLICATIONS

Written Opinion mailed on Jan. 8, 2014 for PCT/EP2013/071394 filed on Oct. 14, 2013 in the name of Saint-Gobain Glass France.

(Continued)

*Primary Examiner* — Alan Cariaso
(74) *Attorney, Agent, or Firm* — Steinfl & Bruno, LLP

(57) ABSTRACT

A polymeric vehicle window is described, having a composite component with an inner opaque polymeric layer and an outer transparent polymeric layer, wherein the inner opaque polymeric layer and the outer transparent polymeric layer are connected in a planar manner. The inner opaque polymeric layer has at least one at least partially piercing hole, an LED assembly, with an LED, a printed circuit board, and electrical contacts arranged in the hole. The LED assembly is placed in such a way that the LED is in the direction of the outer transparent assembly.

15 Claims, 7 Drawing Sheets

(51) Int. Cl.
*B60J 1/20* (2006.01)
*F21S 8/10* (2006.01)
*B60J 1/00* (2006.01)
*B60J 1/10* (2006.01)
*B32B 27/08* (2006.01)
*B32B 27/20* (2006.01)
*B60Q 3/02* (2006.01)
*F21S 13/02* (2006.01)
*B29C 70/88* (2006.01)

(52) U.S. Cl.
CPC . *B60J 1/10* (2013.01); *B60Q 1/268* (2013.01); *B60Q 1/2696* (2013.01); *B60Q 3/0213* (2013.01); *F21S 48/2212* (2013.01); *B29C 70/88* (2013.01); *F21S 13/02* (2013.01); *Y10T 29/49169* (2015.01)

(56) References Cited

U.S. PATENT DOCUMENTS 6,116,678 A    9/2000 Beck
8,833,989 B2 *  9/2014 Barton ............... B60Q 1/268
                                          362/249.02
2002/0021086 A1 * 2/2002 Czak ............... B29C 45/1418
                                          313/503

FOREIGN PATENT DOCUMENTS

DE    19722551       12/1998
DE    102008045447    3/2010
EP    1695808         8/2006
FR    2738783         3/1997
WO    2006/094484     9/2006

OTHER PUBLICATIONS

International Preliminary Report on Patentability mailed on Apr. 21, 2015 for PCT/EP2013/071394 filed on Oct. 14, 2013 in the name of Saint-Gobain Glass France.

International Search Report mailed on Jan. 8, 2014 for PCT/EP2013/071394 filed on Oct. 14, 2013 in the name of Saint-Gobain Glass France.

* cited by examiner

POLYMERIC VEHICLE WINDOW HAVING AN LED ASSEMBLY

CROSS REFERENCE TO RELATED APPLICATIONS

The present application is the US national stage of International Patent Application PCT/EP2013/071394 filed internationally on Oct. 14, 2013 which, in turn, claims priority to European Patent Application No. 12189245.9 filed on Oct. 19, 2012.

The invention relates to a polymeric vehicle window pane with an LED assembly, a method for its production, and its use.

As part of increasingly stringent requirements regarding carbon dioxide emissions of motor vehicles, there are strong efforts to reduce the weight of a motor vehicle and thus its fuel consumption. Constant innovations in the plastics sector enable the replacement of large parts of the metal car body by correspondingly lighter elements made of polymeric materials. In particular, parts of or even the entire window region can be replaced by elements made of polymeric materials. In many cases, along with a clearly lower weight, these have hardness, stability, and toughness comparable to that with a car body window made of steel. In addition, due to the weight reduction, the center of gravity of the motor vehicle is moved lower, which has a positive effect on handling. Moreover, compared to metals, polymeric materials can be produced, processed, and shaped at significantly lower temperatures. This reduces the energy demand and costs during production of the materials.

Molded parts made of polymeric materials can be produced in virtually any desired shape and geometry. Special high-performance plastics such as aramids, for example, Kevlar, have very high strength and stability.

Many material parts made of plastics must fulfill various requirements and functions. In this regard, important parameters are stability, fracture behavior, scratch resistance, impact strength, or notched impact strength. In addition to technical considerations such as weight and strength of the individual components, the shape, geometry, appearance also play an increasingly important role. Especially in the automobile industry, besides mechanical properties, characteristics in the area of design and aesthetics are also of great significance.

In order to combine various characteristics in polymeric materials, they are composed of basic materials of different shapes and different natures. Established methods for producing these materials include two-component or multicomponent injection molding methods. It is thus possible to combine characteristics such as weather resistance, surface gloss, and fracture resistance or torsional stability with each other. In addition, the shares of very expensive materials can be reduced.

DE 196 33 959 A1 discloses a molded article made up of a carrier and an outer decorative film. The outer film has a decorative layer and a protective layer, wherein the protective layer is made of a photopolymerizable resin composition.

WO 2006/094484 A1 discloses a method for producing a flat, plastic autobody part including two components. In a preferred embodiment, the first component is made of a transparent polycarbonate and the second component is made of an opaque polycarbonate.

DE 197 22 551 A1 discloses a method for producing plastic parts in the two-component injection molding process.

EP 1 695 808 A1 discloses a trim part for a motor vehicle, for example, a trim strip. The trim part comprises a carrier part made of a thermoplastic plastic and a cover part. The trim part is preferably produced using a multicomponent injection molding process.

Vehicle windows in motor vehicles, for example, side windows or rear windows, are usually made of glass. However, glass and its surrounding autobody parts can only be bent and varied in their shape to a limited extent. If the vehicle windows are also intended to be consistently connected to electronic components, this is very difficult. Due to their small size and low energy, LEDs play an increasingly greater role in vehicle construction.

The object of the invention is to provide a vehicle window pane that can be produced in different shapes and can, at the same time, integrate an illumination function.

The object of the invention is accomplished by a polymeric vehicle window pane according to claim 1. Preferred embodiments emerge from the subclaims.

The method according to the invention for producing the polymeric vehicle window pane and its use for vehicles emerge from additional independent claims. Preferred embodiments emerge from the subclaims.

The polymeric vehicle window pane according to the invention comprises at least one composite component. This one composite component comprises an inner opaque polymeric layer and an outer transparent polymeric layer. The term "inner" refers, in the context of the invention, to the side of the installed window pane facing the vehicle interior. The term "outer" refers to the side of the vehicle window pane facing outward. In the context of the invention, the term "polymeric layer" comprises polymeric workpieces. The inner opaque polymeric layer and the outer transparent polymeric layer are fixedly bonded to each other areally. The inner opaque, polymeric layer includes at least one at least partially penetrating recess. Preferably, a plurality of recesses are arranged a short distance from each other, for example, 0.2 cm to 10 cm, particularly preferably 0.5 cm to 3 cm. The term "recess" describes throughbores or holes within the polymeric layer. An LED assembly with at least one LED or even one OLED, one printed circuit board (PCB), and electrical contacting is arranged in the recess. The printed circuit board comprises commercially available conductor boards and/or printed circuit boards. These are made from electrically insulating materials, onto which electrical connections are applied. Examples of insulating materials are nonconductive polymers, such as epoxy-resin-impregnated glass fibers, Teflon, ceramic, and/or polyester film. The electrical connections, for example, conducting wires, preferably contain copper, iron, tin, nickel, gold, silver, and/or alloys thereof. The LEDs are mounted on the printed circuit board and contacted via the electrical connections. The electrical connector produces the connection to the power source. Preferably, a control device is also arranged between the electrical connector and the power source. This control device enables the targeted illumination of individual LEDs. By means of the arrangement of different colored LEDs on the LED conductor board, colored light effects can also be generated. The LED assembly is placed inside the recess such that the LEDs are placed in the direction of the outer transparent assembly. The light emitted from the LEDs can thus be emitted outward directly through the outer transparent polymeric layer. The outer transparent polymeric layer preferably has an average optical transparency of more than 60%, preferably more than 80% in the range from 400 nm to 800 nm. The high optical transparency gives the polymeric cover part a glasslike appearance with only low intrinsic weight and high ductility. In addition, the recesses of the inner opaque layer are protected against moisture and weathering. Depending on the design of the transparent layer, the recesses and the LEDs can also be visually hidden such that only the emitted light is visible.

In a preferred embodiment, the polymeric vehicle window pane according to the invention is a side window pane, in particular a stationary rear side window pane. In another preferred embodiment, the polymeric vehicle window pane according to the invention is a rear window.

The outer transparent polymeric layer preferably has an elevation or depression in the region of the recess of the adjacently situated inner opaque polymeric layer. This elevation or depression can visually highlight the LED assembly inside the recess.

The recess with the LED assembly preferably has a cover. This arrangement protects the LED assembly against dirt and moisture from the vehicle interior.

The outer transparent polymeric layer preferably has an additional recess in the region above the recess of the inner opaque polymeric layer.

The recess and/or additional recess also preferably have angular or rounded, particularly preferably circular, slit shaped and/or rounded surfaces or incisions. These incisions can refract or reflect the light emitted by the LED. In this manner, additional optical effects can be generated in the region of the LED assembly.

The inner opaque polymeric layer and the outer transparent polymeric layer preferably contain polyethylene (PE), polycarbonates (PC), polypropylene (PP), polystyrene, polybutadiene, polynitriles, polyesters, polyurethanes, polymethyl methacrylates, polyacrylates, polyesters, polyamides, polyethylene terephthalate, preferably acrylonitrile-butadiene-styrene (ABS), acrylester-styrene-acrylonitrile (ASA), acrylonitrile-butadiene-styrene-polycarbonate (ABS/PC), polyethylene terephthalate-polycarbonate (PET/PC), and/or copolymers or mixtures thereof.

The outer transparent polymeric layer preferably contains polycarbonates (PC), polymethyl methacrylate (PMMA), styrene-acrylonitrile (SAN), and/or copolymers or mixtures thereof.

The outer transparent polymeric layer preferably includes a hardcoat, preferably a heat-curing or UV-curing lacquer, particularly preferably polysiloxanes, polyacrylates, polymethacrylates, and/or mixtures or copolymers thereof. The hardcoat improves the resistance to mechanical scratch damage, weathering effects, temperature fluctuations, UV radiation, and/or aggressive chemicals from the air or water spray. In addition, the hardcoat can also assume decorative functions.

The inner opaque polymeric layer preferably includes inorganic or organic fillers, preferably $SiO_2$, $Al_2O_3$, $TiO_2$, clay minerals, silicates, zeolites, glass fibers, carbon fibers, glass balls, organic fibers, and/or mixtures thereof. The fillers can further increase the stability of the carrier portion. In addition, the fillers can reduce the share of polymeric materials and thus reduce the production costs of the component.

The inner opaque polymeric layer preferably has large window openings, particularly preferably in the range from 20 vol.-% to 80 vol.-% of the inner opaque polymeric layer. These window openings are covered by the outer transparent polymeric layer and form the transparent window region.

The LED assembly is preferably connected to light guides. These light guides can be laid in the region of the recesses, on or through the outer transparent layer and thus generate additional optical light effects.

The invention further includes a method for producing a polymeric vehicle window pane, wherein, in a first step, a composite component comprising an inner opaque polymeric layer and an outer transparent polymeric layer is obtained in a two-component injection molding process or a two-component injection-compression molding process. The inner opaque polymeric layer as at least one at least partially penetrating recess. After the curing of the composite part, an LED assembly is arranged in the recess and electrically contacted. In a final step, the recess is closed with a cover.

The outer transparent polymeric layer is preferably provided with a hardcoat. The application of the hardcoat is preferably done by spraying or flow coating.

The invention further includes the use of the polymeric vehicle window pane according to the invention as a side window pane, preferably a stationary rear side window pane, or a rear window pane of a motor vehicle, particularly preferably a car, truck or bus.

In the following, the invention is explained in detail with reference to drawings. The drawings are purely schematic representations and are not true to scale. They in no way restrict the invention.

They depict:

FIG. 1 a side view of a vehicle window pane according to the invention,

FIG. 2 a schematic three-dimensional view of the vehicle window pane according to the invention, FIG. 3 a detail of the vehicle window pane in the region of the recesses, FIG. 4 another detail of the vehicle window pane in the region of the recesses, FIG. 5 another enlarged detail in the region of the recesses, FIG. 6 an alternative embodiment in the region of the recesses, and FIG. 7 a schematic top plan view of the vehicle window pane according to the invention.

FIG. 1 depicts a side view of the vehicle window pane according to the invention. The vehicle window pane is a rear side window pane. The composite component (8) includes an inner opaque polymeric layer (1) indicated the edge region and an outer transparent polymeric layer (2). In the region of the window opening (13), the inner opaque polymeric layer (1) is absent and forms the transparent window region. In the region of the dash line, the recesses (3) and the LED assemblies (4) are installed. Preferably, the composite component (8) includes 2 to 50 recesses (3) with LED assemblies (4); optionally, the LED assemblies can also be combined with light guides (not shown), for example, glass fibers.

The invention is described here, by way of example, for a rear side window pane, but is equally usable, for example, for rear window panes.

FIG. 2 depicts a schematic three-dimensional view of the rear side window pane according to the invention. The inner opaque polymeric layer (1) and an outer transparent polymeric layer (2) form the basic structure. In the region of an elevation (9) of the inner opaque polymeric layer (1) and of the outer transparent polymeric layer (2), the recesses (3) are arranged in the inner opaque polymeric layer (1) in the form of cylindrical openings.

Figure 3:
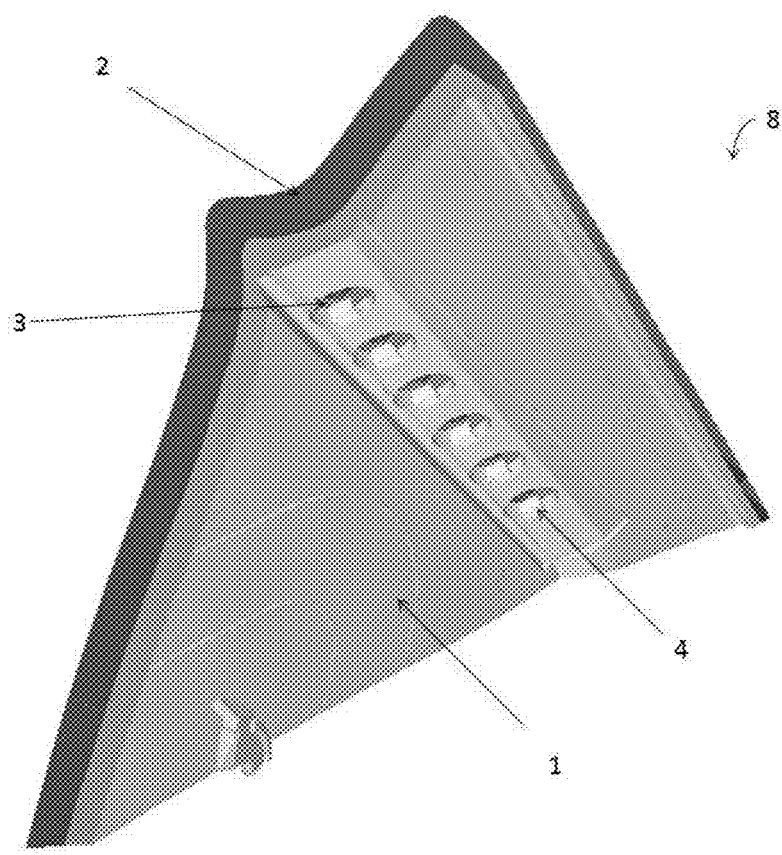
FIG. 3 depicts a detail of the composite part (8) in the region of the recesses (3). The LED assemblies are arranged inside the recesses (3) of the inner opaque polymeric layer (1) and emit light via the LEDs (5) (not shown) outward through the outer transparent polymeric layer (2).
Figure 4:
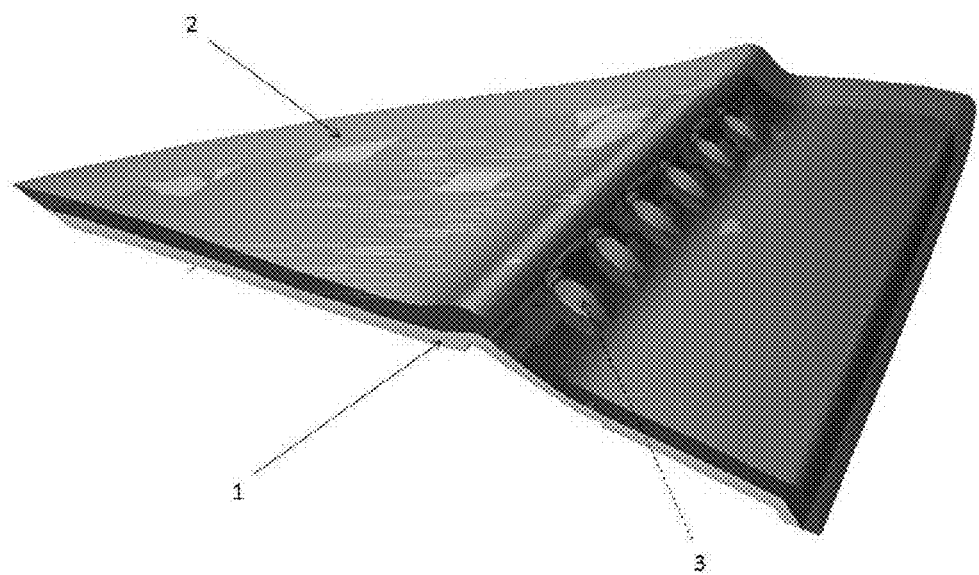
FIG. 4 depicts another detail of the composite part (8) in the viewing direction onto the outer transparent polymeric layer (2). The structure corresponds to that described in FIG. 3.
Figure 5:
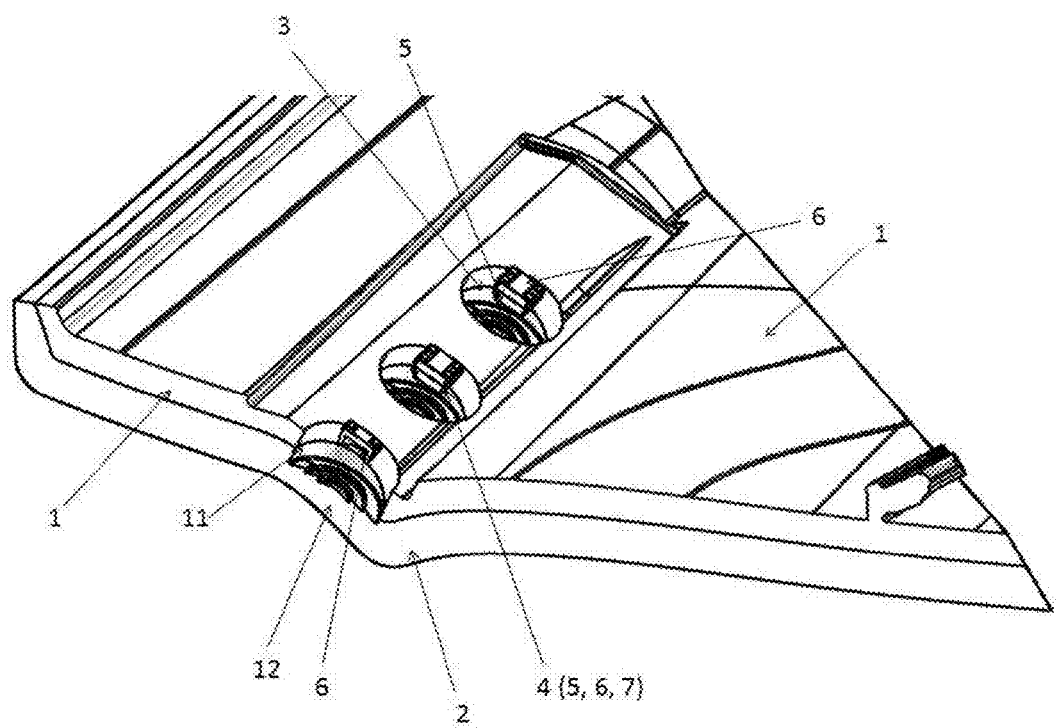

FIG. 5 depicts another enlarged detail of the composite part (8) in the region of the recesses (3). The structure corresponds to that described in FIGS. 3 and 4. The LED assemblies (4) composed of LED (5), printed circuit board (6), and electrical contact (7) are mounted in the recesses (3). The recesses (3) are expanded by an additional recess (11) in the outer transparent polymeric layer (2). The additional recesses (11) also include reflective surfaces (12), which enable a further variation of the light emitted by the LED assembly.

Figure 6:
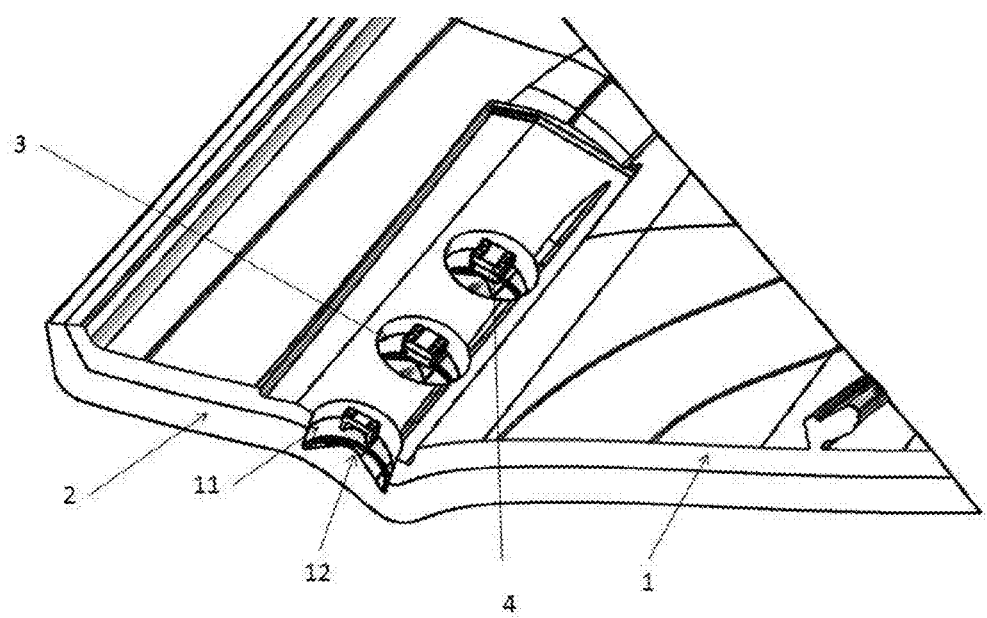

FIG. 6 depicts an alternative embodiment in the region of the recesses (3). The structure corresponds to that depicted in FIG. 5. The additional recesses (11) also contain angular reflective surfaces, (12) which cause additional light scattering.

Figure 1:
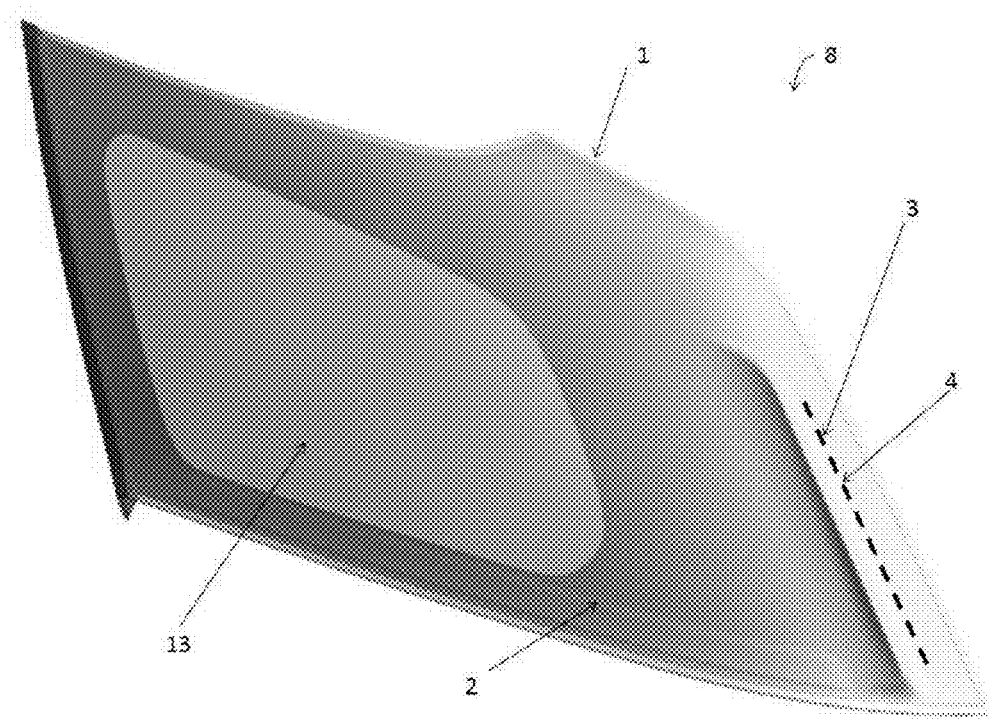
Figure 2:
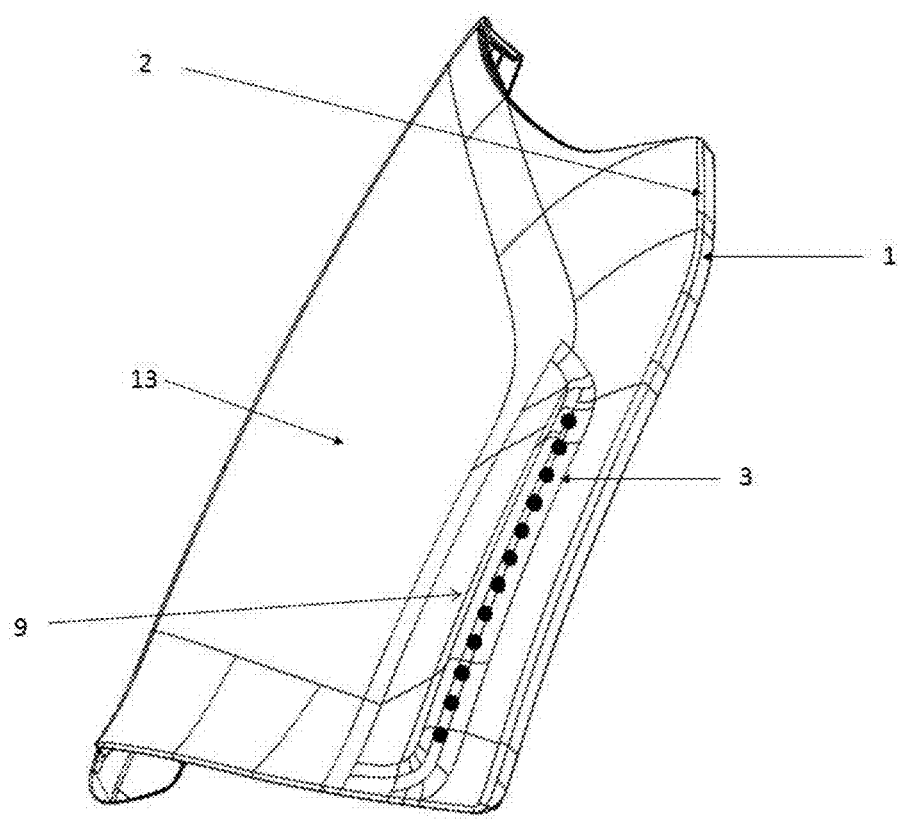
Figure 7:
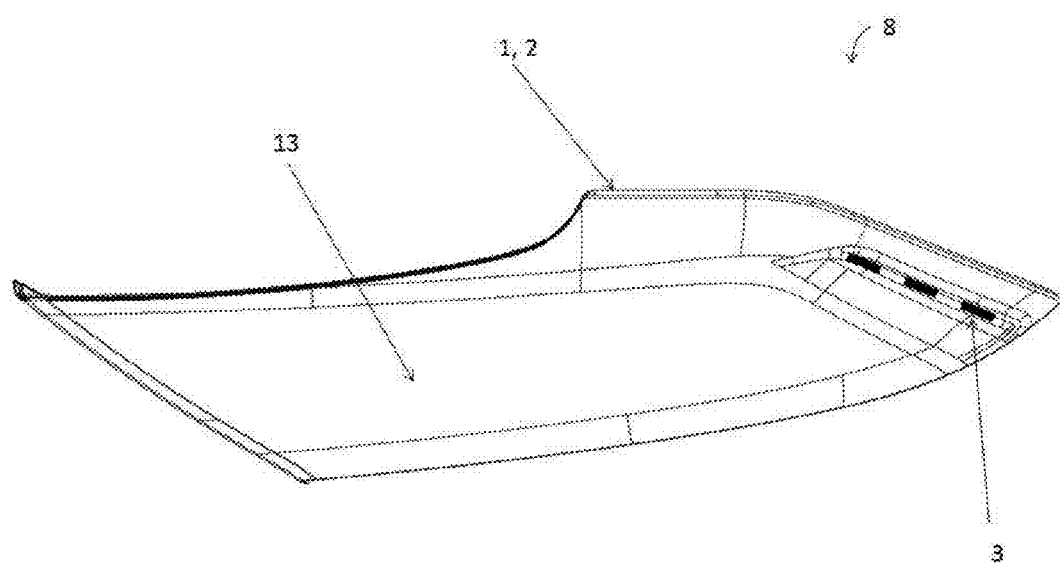

FIG. 7 depicts a schematic top plan view of the horizontally oriented rear side window pane according to the invention. The structure corresponds to the structure depicted in FIG. 2 from the top plan view.

LIST OF REFERENCE CHARACTERS (1) an inner opaque polymeric layer
(2) outer transparent polymeric layer
(3) recess
(4) LED assembly
(5) LED or OLED
(6) printed circuit board
(7) electrical contact
(8) composite component
(9) elevation
(10) depression
(11) additional recess (in the outer transparent polymeric layer)
(12) reflective surfaces
(13) window opening
(14) cover
(15) hardcoat

The invention claimed is:

1. A polymeric vehicle window pane, comprising:
a composite component having an inner opaque polymeric layer and an outer transparent polymeric layer,
wherein the inner opaque polymeric layer and the outer transparent polymeric layer are areally bonded,
wherein the inner opaque polymeric layer has at least one at least partially penetrating recess, and an LED assembly, having one LED, one printed circuit board, and electrical contacting, is arranged in the recess, and
wherein the LED assembly is placed such that the LED is aimed in the direction of the outer transparent polymeric layer.

2. The vehicle window pane according to claim 1, which is a side window pane, preferably a stationary rear side window pane, or a rear window pane.

3. The vehicle window pane according to claim 1, wherein the outer transparent polymeric layer has an elevation or depression in the region of the recess of the inner opaque polymeric layer.

4. The vehicle window pane according to claim 1, wherein the recess has a cover.

5. The vehicle window pane according claim 1, wherein the outer transparent polymeric layer has an additional recess in the region of the recess of the opaque polymeric layer.

6. The vehicle window pane according to claim 5, wherein the recess and/or additional recess has angular preferably circular, slit-shaped and/or rounded reflective surfaces.

7. The vehicle window pane according to claim 1, wherein the inner opaque polymeric layer and the outer transparent polymeric layer contain polyethylene (PE), polycarbonates (PC), polypropylene (PP), polystyrene, polybutadiene, polynitriles, polyesters, polyurethanes, polymethyl methacrylates, polyacrylates, polyesters, polyamides, polyethylene terephthalate, preferably acrylonitrile-butadiene-styrene (ABS), acrylester-styrene-acrylonitrile (ASA), acrylonitrile-butadiene-styrene-polycarbonate (ABS/PC), polyethylene terephthalate-polycarbonate (PET/PC), and/or copolymers or mixtures thereof.

8. The vehicle window pane according to claim 1, wherein the outer transparent polymeric layer contains polycarbonates, polymethyl methacrylate, styrene-acrylonitrile, and/or copolymers or mixtures thereof.

9. The vehicle window pane according to claim 1, wherein the outer transparent polymeric layer includes a hardcoat, preferably heat-curing or UV-curing lacquer, particularly preferably polysiloxanes, polyacrylates, polymethacrylates, and/or mixtures or copolymers thereof.

10. The vehicle window pane according to claim 1, wherein the inner opaque polymeric layer includes inorganic or organic fillers, preferably $SiO_2$, $Al_2O_3$, $TiO_2$, clay minerals, silicates, zeolites, glass fibers, carbon fibers, glass beads, organic fibers, and/or mixtures thereof.

11. The vehicle window pane according to claim 1, wherein the inner opaque polymeric layer has a large window opening, preferably in the range from 20 vol.-% to 80 vol.-%.

12. The vehicle window pane according to claim 1, wherein the LED assembly is connected to light guides.

13. A method for producing a polymeric vehicle window pane, wherein
a composite component comprising an inner opaque polymeric layer and an outer transparent polymeric layer is obtained in a two-component injection molding process or a two-component injection-compression molding process, wherein the inner opaque polymeric layer has at least one at least partially penetrating recess,
an LED assembly is arranged in the recess and contacted, and
the recess is closed with a cover.

14. The method according to claim 13, wherein the outer transparent polymeric layer is provided with a hardcoat.

15. Use of a polymeric vehicle window pane according to claim 1 as a side window pane, preferably a stationary rear side window pane, or a rear window pane of a motor vehicle, preferably a car, truck, or bus.

* * * * *